J. A. MacLEAN.
PARACHUTE.
APPLICATION FILED NOV. 18, 1916.
1,233,087.
Patented July 10, 1917.
2 SHEETS—SHEET 2.
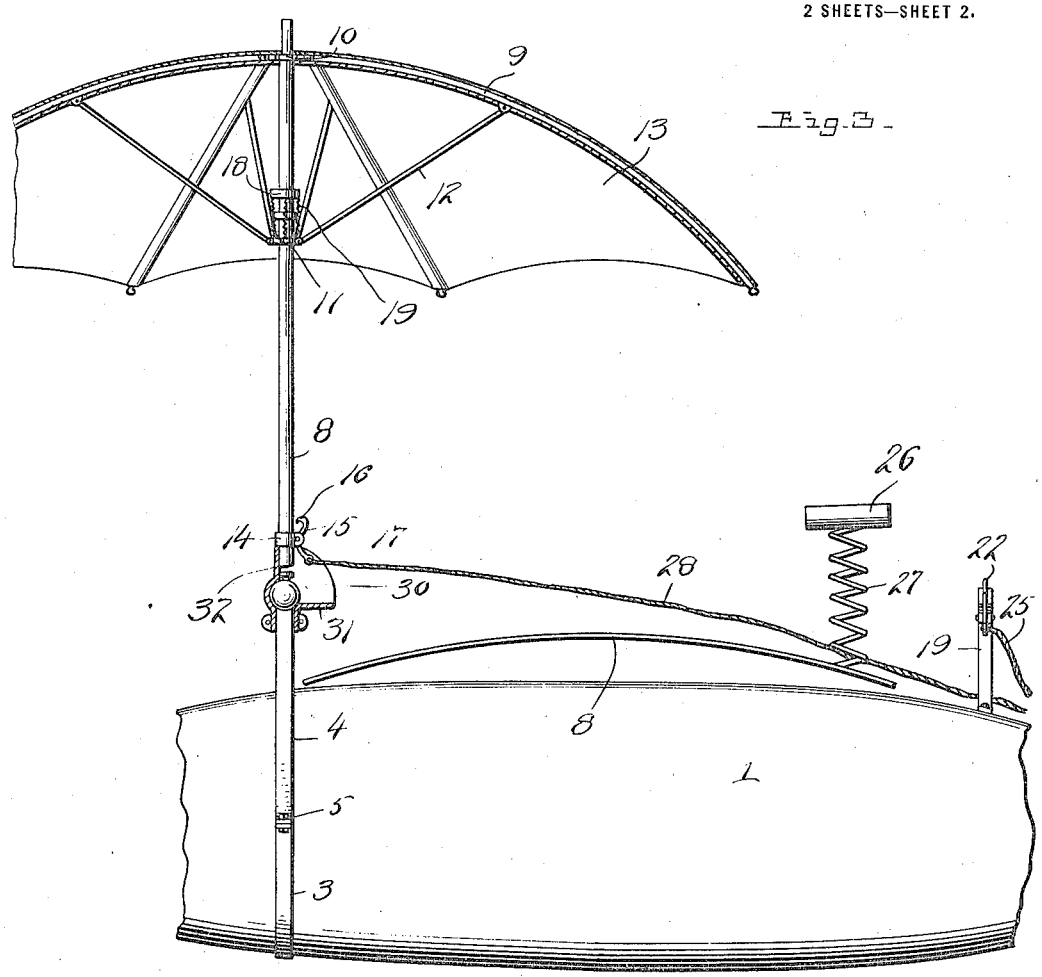
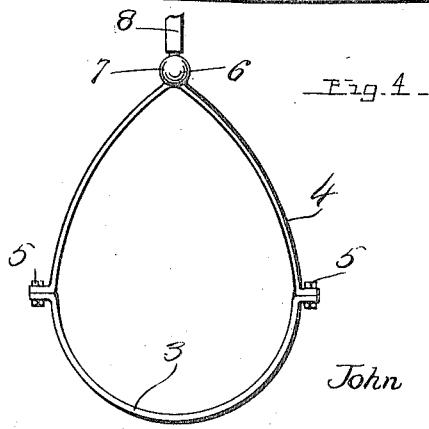
WITNESSES
INVENTOR
John A. Mac Lean.
BY
ATTORNEY

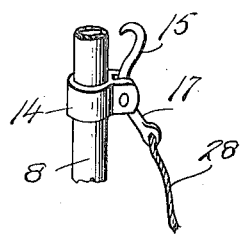
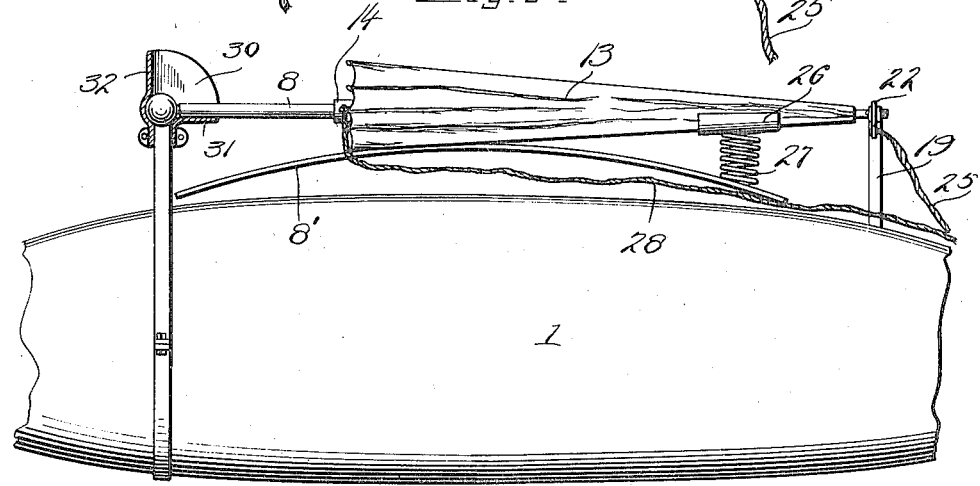
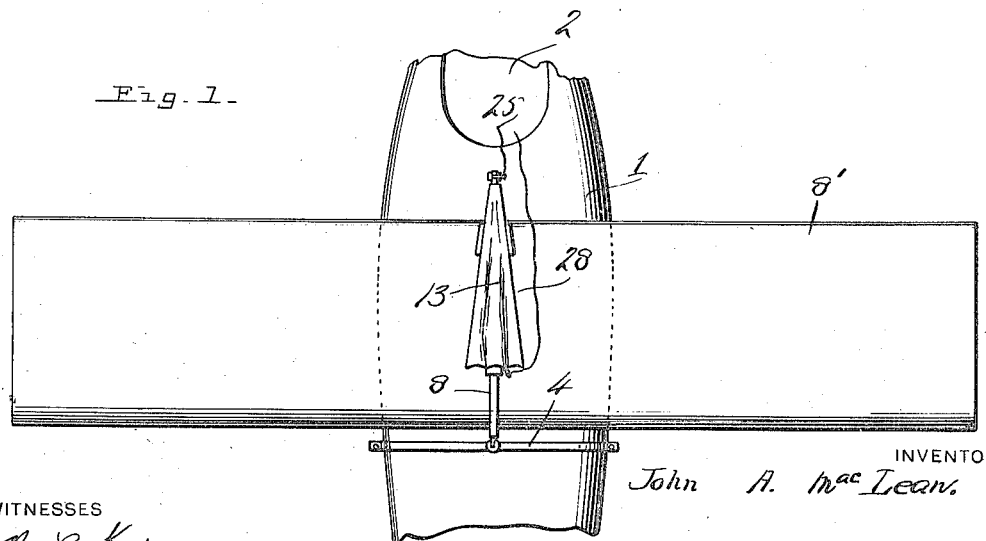

UNITED STATES PATENT OFFICE.

JOHN A. MacLEAN, OF STROME, ALBERTA, CANADA.

PARACHUTE.

1,233,087. Specification of Letters Patent. Patented July 10, 1917.

Application filed November 18, 1916. Serial No. 132,230.

*To all whom it may concern:*

Be it known that I, JOHN A. MACLEAN, a subject of the King of Great Britain, residing at Strome, in the Province of Alberta and Dominion of Canada, have invented certain new and useful Improvements in Parachutes, of which the following is a specification.

This invention has relation to safety appliances for aeroplanes or the like, and has for an object to provide a device for retarding the fall of an aeroplane, airship, or the like, when its propelling or sustaining mechanism has been rendered inoperative, thereby insuring a safe landing of the machine.

Another object of the invention is to provide a device for performing the above named object, and embodying a parachute whereby the weight of the machine may be partly sustained and means, whereby the disposal of the parachute in an operative position, when released by the operator, may be positively insured.

A still further object of the invention is to provide a device of the character set forth, which may be quickly and readily attached to aeroplanes of standard construction.

In addition to the foregoing my invention comprehends improvements in the details of construction and arrangement of the correlated parts to be hereinafter more fully described and particularly set forth in the appended claim.

In the accompanying drawings in which similar and corresponding parts are designated by the same characters of reference throughout the several views in which they appear;

Figure 1, is a fragmentary view in plan of an aeroplane, illustrating the application thereto of my invention.

Fig. 2, is a fragmentary view in side elevation of an aeroplane illustrating a view of the device on an enlarged scale, and in a lowered position.

Fig. 3, is a similar view illustrating the device in an operative position.

Fig. 4, is a detail view of the clamps for securing the device to the body of an aeroplane, Fig. 5, is a detail view in perspective of the rack for retaining the parachute in a folded position, and Fig. 6, is a detail view in perspective of the latch for retaining the parachute in a lowered position.

With reference to the drawings, 1 indicates the body of an aeroplane of the monoplane, type, and having a forward recess 2 in which the aviator may be seated. The body of an aeroplane of this type is somewhat circular or elliptical in cross section, varying throughout its length, and owing to this fact, I have devised a clamping member set forth in detail in Fig. 4, which comprises a semi-circular member 3 designed to engage the under side of the body portion of an aeroplane, and an upper portion 4 substantially semi-elliptical, the terminals of said members being removably secured together by means of bolts or the like 5. The upper or intermediate portion of the clamping member 4 is formed with the receptive complemental member 6 of a ball and socket joint, the spherical member 7 held therewithin being formed upon the lower end of the parachute rod, 8.

The clamping member is preferably encircled about the body portion of the aeroplane just behind the supporting planes 8' thereof, and in a normal position, the parachute rod is disposed horizontally and in close relation to the surface of the supporting planes 8', and is extended in a forwardly directed position. The parachute is constructed somewhat after the fashion of an umbrella, and comprises radial flexible ribs 9 which are pivotally connected to a central pin located upon the free terminal of the parachute rod, and a sliding collar 11 is encircled about the rod, and is connected by means of braces 12 to the ribs 9 at intermediate portions thereof. The ribs are covered by means of a heavy fabric 13, and it will be obvious that as the sliding collar 11 is moved longitudinally of the parachute rod, the ribs may be extended or collapsed to dispose the fabric in an extended or otherwise position, accordingly as the parachute is required. Located adjacent the pivoted end of the parachute rod is a collar 14 fixedly secured to the rod for pivotally supporting a latch 15 having a hook terminal 16, and an oppositely extending portion 17. When the parachute is in a folded position, the sliding collar 11 will be disposed adjacent the latch and the hook terminal thereof may engage over the collar to retain the same in lowered position, a collar 18 being fixedly secured to the parachute rod adjacent the upper end, and a plurality of coil springs 19 connected at their ends to the sliding collar 11 and to the fixed collar 18. In this manner, owing to the tension of the springs, the tendency is to retain the parachute in an extended or operative position, the latch 15 thus acting to retain the sleeve 11 in a lowered position against the tension of the spring, whereby the parachute may be retained in a folded position.

Owing to the ball and socket connection of the parachute rod with the clamping member, the parachute may be disposed in a normally horizontal position, and a post 19 is erected upon the upper surface of the aeroplane body in the path of movement of the free terminal of the parachute rod, and is provided at its upper end with a substantially U-shaped member 20 having its terminals upwardly directed whereby to receive therebetween the parachute rod. The standard 19 is formed with a laterally extended spaced ear 21 in which is pivotally received the latch member 22 having an overhanging arcuate terminal 23 adapted to extend over the U-shaped member 20 in order to retain the end of the parachute rod therein, the opposite end of the latch being provided with an arm 24 to which a flexible element 25 is connected and extended forwardly within reach of the operator. When the parachute is disposed in this normal horizontal position, it is rested upon a projecting element, including a substantially trough shaped member 26 in which the parachute rests, said member 26 being supported upon a stout coil spring 27 secured to the top of the supporting plane. Thus, the tendency of the spring is to urge the parachute in an upward direction against the tension of the latch terminal 23. The arm 17 of the aforedescribed latch 15 is also provided with a flexible element 28 which extends forward within reach of the operator whereby it may be grasped and actuated along with the flexible element 25. Adjacent the ball and socket connection, is a guiding member, formed of spaced segmental members 30 connected at either end by horizontally and vertically extending portions 31 and 32 respectively, the parachute rod being designed to move between said segmental members whereby the parachute rod may be guided in its movement from a horizontal to a raised position.

In operation, should the driver of an aeroplane lose control of the same through disorganization of the propelling or sustaining mechanism, the rate of fall of the aeroplane may be retarded by pulling simultaneously or otherwise, upon the flexible elements 25 and 28, whereupon the free terminal of the parachute rod is released from engagement with the latch member 22, and under the influence of the spring 27 it is projected to a vertical position. As the latch member 15 is released by the strain placed upon the flexible element 28 the coil springs 19 of the parachute act to move the sliding collar 11 along the rod thereby moving the parachute to an extended position, said movement being furthermore accelerated by the imprisonment of air beneath the parachute.

Thus, it will be seen that I have provided a device in which any possibility of the parachute being prevented from expanding is entirely obviated through the provision of the projecting mechanism. Furthermore, it will be noted, that when not required, the parachute may be disposed in a position to interfere as little as possible with the forward travel of the machine.

While I have illustrated and described my invention with some degree of particularity, I realize that in practice various alterations thereover may be made and I therefore, reserve the right and privilege of changing the form of the details of construction, or otherwise altering the arrangement of the correlated parts, without departing from the spirit of the invention or the scope of the appended claim.

Having thus described my invention what I claim as new and desire to secure by Letters Patent is:

In an airship, the combination of a folding parachute, means for supporting the parachute upon an aeroplane whereby the parachute may be disposed in a normally horizontal position, or an active vertical position, a trough shaped member in which the parachute is adapted to rest when in a horizontal position, a coil spring for urging said trough shaped member in an upward direction, a standard erected upon the top of the machine, a latch member mounted on said standard for engaging the parachute to retain the same in a horizontal position against the tension of the spring, means for urging the parachute to an extended position, releasable means for retaining the parachute in a folded position, and projecting means whereby when the releasable means and latch are actuated the parachute may be projected to a vertical position, and permitted to expand.

In testimony whereof I affix my signature in presence of two witnesses.

JOHN A. MacLEAN.

Witnesses:
ALICE TUCKER,
EDGAR L. TAYLOR.